United States Patent
Fu et al.

(10) Patent No.: US 8,062,759 B2
(45) Date of Patent: Nov. 22, 2011

(54) THERMAL BARRIER COATING SYSTEMS INCLUDING A RARE EARTH ALUMINATE LAYER FOR IMPROVED RESISTANCE TO CMAS INFILTRATION AND COATED ARTICLES

(75) Inventors: Ming Fu, Hamilton, OH (US); Ramgopal Darolia, West Chester, OH (US); Mark Gorman, West Chester, OH (US); Bangalore Aswatha Nagaraj, West Chester, OH (US)

(73) Assignee: General Electric Company, Schenectady, NY (US)

( * ) Notice: Subject to any disclaimer, the term of this patent is extended or adjusted under 35 U.S.C. 154(b) by 998 days.

(21) Appl. No.: 11/964,953

(22) Filed: Dec. 27, 2007

(65) Prior Publication Data

US 2009/0169914 A1 Jul. 2, 2009

(51) Int. Cl.
    *B32B 9/00* (2006.01)
(52) U.S. Cl. ......... 428/469; 428/472; 428/701; 428/702
(58) Field of Classification Search .................. 428/450, 428/633, 689, 701, 702
See application file for complete search history.

(56) References Cited

U.S. PATENT DOCUMENTS

| | | | | |
|---|---|---|---|---|
| 6,558,814 | B2 * | 5/2003 | Spitsberg et al. | 428/633 |
| 6,602,814 | B1 | 8/2003 | Gadow | |
| 2004/0028941 | A1 * | 2/2004 | Lane et al. | 428/689 |
| 2004/0175597 | A1 | 9/2004 | Litton | |
| 2006/0115659 | A1 * | 6/2006 | Hazel et al. | 428/450 |
| 2006/0121293 | A1 | 6/2006 | Boutwell | |
| 2006/0121295 | A1 | 6/2006 | Boutwell | |
| 2006/0280953 | A1 | 12/2006 | Hazel | |
| 2006/0280954 | A1 | 12/2006 | Spitsberg | |
| 2006/0280955 | A1 | 12/2006 | Spitsberg | |
| 2006/0280963 | A1 * | 12/2006 | Hazel et al. | 428/689 |
| 2007/0160859 | A1 | 7/2007 | Darolia | |
| 2007/0224411 | A1 | 9/2007 | Hazel | |
| 2008/0160201 | A1 | 7/2008 | Boutwell | |
| 2008/0220172 | A1 | 9/2008 | Boutwell | |

OTHER PUBLICATIONS

Friedrich C et al, "Lanthanum Hexaaluminate—A New material for Atmospheric Plasma spraying of Advanced Thermal Barrier Coatings," Journal of Thermal Spray Technology, ASM International, Materials Park, US, vol. 10, No. 4, (Dec. 1, 2001), pp. 592-598.

Gadow R et al, "Lanthanum Hexaaluminate—Novel Thermal Barrier Coatings for Gas Turbine Applications—Materials and Process Development," Surface and Coatings Technology, Elsevier, Amsterdam, NL, vol. 151/152, (Jan. 1, 2001), pp. 392-399.

Friedrich C J et al, "Lanthanum Hexaaluminate Thermal Barrier Coatings," Ceramic Engineering and Science Proceedings, Columbus, US, vol. 22, No. 4, (Jan. 1, 2001), pp. 375-382.

(Continued)

*Primary Examiner* — Timothy Speer
(74) *Attorney, Agent, or Firm* — General Electric Company; Marcella R. Louke

(57) ABSTRACT

Thermal barrier coating systems for use with hot section components of a gas turbine engine include an inner layer overlying a bond coated substrate and a top layer overlying at least a portion of the inner layer. The inner layer includes a thermal barrier material such as yttria-stabilized zirconia. The top layer includes a rare earth aluminate. The thicknesses and microstructures of the layers may be varied depending on the type of component to be coated. Articles incorporating the thermal barrier coating system exhibit improved resistance to CMAS infiltration.

11 Claims, 5 Drawing Sheets

OTHER PUBLICATIONS

Schaefer G W et al, "Lanthane Aluminate Thermal Barrier Coating," Ceramic Engineering and Science Proceedings 1999 American Ceramic Soc., vol. 20, No. 4, 1999, pp. 291-297.

Ma W et al, "The Thermal Cycling Behavior of Lanthanum-Cerium Oxide Thermal Barrier Coating Prepared by EB-PVD," Surface and Coatings Technology, Elsevier, Amsterdam, NL, vol. 200, No. 16-17, (Apr. 27, 2007), pp. 5113-5118.

Cao X Q et al, "Ceramic Materials for Thermal Barrier Coatings," Journal of the European Ceramic Society, Elsevier Science Publishers, Barking, Essex, GB, vol. 24, No. 1, (Jan. 1, 2004), pp. 1-10.

* cited by examiner # THERMAL BARRIER COATING SYSTEMS INCLUDING A RARE EARTH ALUMINATE LAYER FOR IMPROVED RESISTANCE TO CMAS INFILTRATION AND COATED ARTICLES

FIELD OF THE INVENTION

The present invention is directed to a multilayer coating system for hot section turbine components, and more specifically to a multilayer coating that includes rare earth elements and coated articles

BACKGROUND OF THE INVENTION

Calcium-magnesium-aluminum-silicate (CMAS) infiltration is a phenomenon that is linked to thermal barrier coating (TBC) spallation in hot section turbine components.

Thermal barrier coatings are utilized on hot section engine components including combustor section and turbine section components to protect the underlying base materials from high temperatures as a result of the flow of hot gases of combustion through the turbine. These hot gases of combustion can be above the melting point of the base materials, which typically are superalloy materials, being based on iron, nickel, cobalt and combinations thereof. The thermal barrier coatings provide passive protection from overheating, and are used in conjunction with cooling airflow that provides active cooling protection.

Under service conditions, these thermal barrier-coated hot section engine components can be susceptible to various modes of damage, including erosion, oxidation and corrosion from exposure to the gaseous products of combustion, foreign object damage and attack from environmental contaminants. Environmental contaminants that can be present in the air include sand, dirt, volcanic ash, sulfur in the form of sulfur dioxide, fly ash, particles of cement, runway dust, and other pollutants that may be expelled into the atmosphere, such as metallic particulates, such as magnesium, calcium, aluminum, silicon, chromium, nickel, iron, barium, titanium, alkali metals and compounds thereof, including oxides, carbonates, phosphates, salts and mixtures thereof. These environmental contaminants are in addition to the corrosive and oxidative contaminants that result from the combustion of fuel. These contaminants can adhere to the surfaces of the hot section components, which are typically thermal barrier coated.

At the operating temperature of the engine, these contaminants can form contaminant compositions on the thermal barrier coatings. These contaminant compositions typically include calcia, magnesia, alumina, silica (CMAS), and their deposits are referred to as CMAS. At temperatures above about 2240° F., these CMAS compositions may become liquid and infiltrate into the TBC. This infiltration by the liquid CMAS destroys the compliance of the TBC, leading to premature spallation of the TBC. In addition to the compliant loss, deleterious chemical reactions with yttria and zirconia within the TBC, as well as with the thermally grown oxide at the bond coating/TBC interface, occur and result in a degradation of the coating system.

The spallation due to CMAS infiltration has become a greater problem in jet engines as their operating temperatures have increased to improve efficiency, as well as in engines operating in the Middle East and in coastal regions. High concentrations of fine sand and dust in the ambient air can accelerate CMAS degradation. A typical composition of CMAS is, for example, 35 mole % CaO, 10 mol % MgO, 7 mol % $Al_2O_3$, 48 mol % $SiO_2$, 3 mol % $Fe_2O_3$ and 1.5 mol % NiO. And of course, spallation of the TBC due to exposure to CMAS at elevated temperature only sets the stage for more serious problems. Continued operation of the engine once the passive thermal barrier protection has been lost leads to rapid oxidation of the base metal superalloy protective coating and the ultimate failure of the component by burn through or cracking. In fact, such significant distress has been observed in both military and commercial engines.

Various solutions to the problem of CMAS degradation have been attempted. However, as operating temperatures of engines have gradually trended higher, ever more effective treatments are required. What is needed is a TBC system that is resistant to CMAS penetration at elevated temperatures.

SUMMARY OF THE INVENTION

Embodiments disclosed herein provide a CMAS infiltration-resistant thermal barrier coating system for application to a substrate. An exemplary embodiment includes a bond coat overlying and in contact with the substrate; and a thermal barrier coating overlying the bond coat. An exemplary thermal barrier coating comprises an inner layer comprising a thermal barrier coating material including at least one of zirconia and hafnia; and a top layer overlying at least a portion of the inner layer, wherein the top layer includes a rare earth aluminate-containing material.

In an exemplary embodiment, a CMAS infiltration-resistant thermal barrier coating system includes a bond coat overlying and in contact with the substrate and a thermal barrier coating overlying the bond coat. An exemplary bond coat includes at least one of the group consisting of a MCrAlX overlay coating, a simple diffusion aluminide coating, and a platinum modified aluminide coating. An exemplary thermal barrier coating includes an inner layer comprising a thermal barrier coating material including at least one of zirconia and hafnia; and a top layer overlying at least a portion of the inner layer. The top layer includes a rare earth aluminate-containing material comprising at least one member of the group consisting of a single phase rare earth aluminate compound, a mixture of two or more rare earth aluminate compounds, a rare earth aluminate compound and aluminum oxide ($Al_2O_3$), and a rare earth aluminate compound and rare earth oxide.

DETAILED DESCRIPTION OF THE INVENTION

Figure 1:
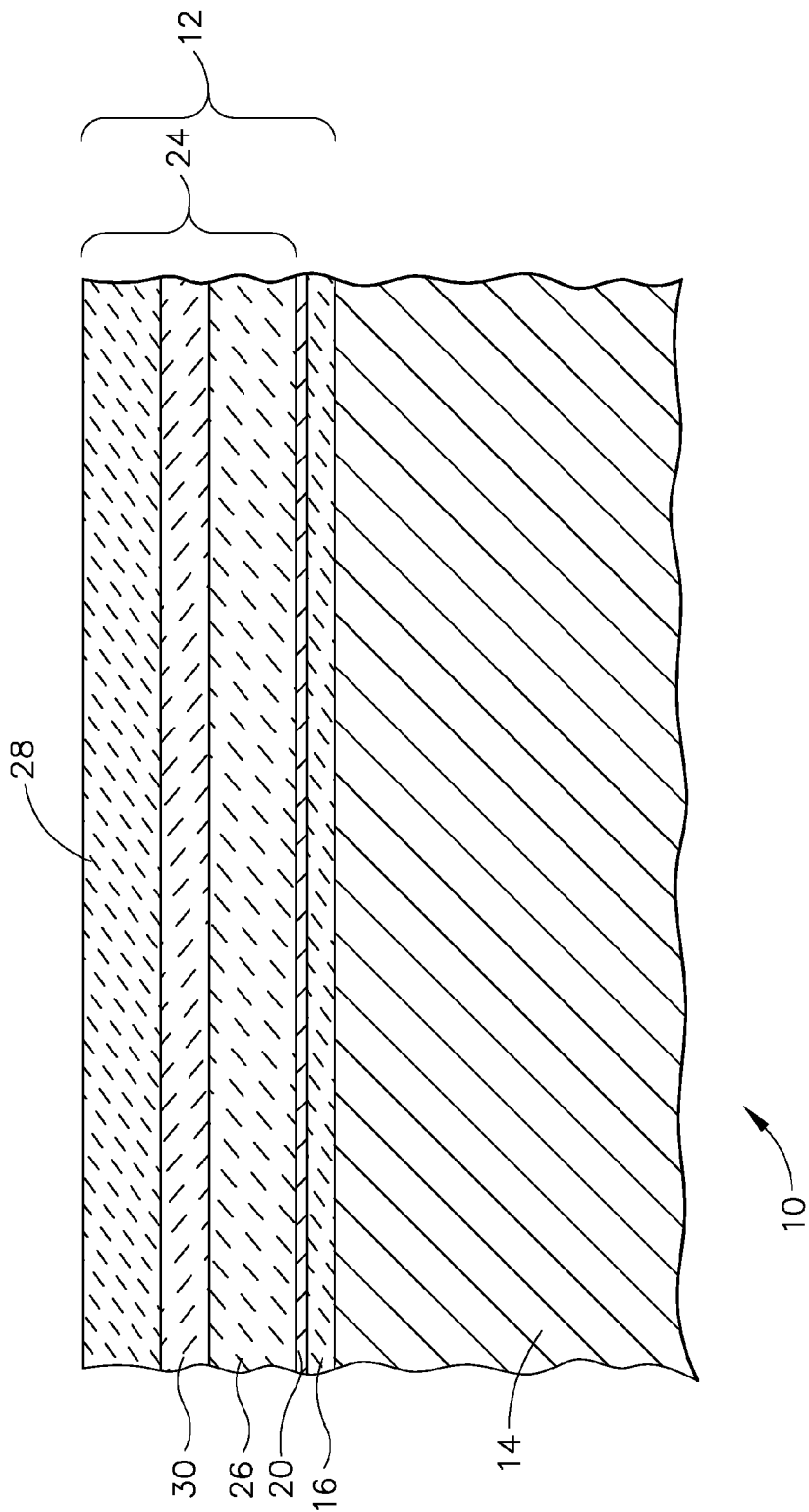
FIG. 1 depicts a schematic cross-sectional view of an as-coated article embodying an exemplary coating system.

Referring now to FIG. 1, exemplary embodiments include a coated article 10 including a multi-layer thermal barrier coating system 12 that is resistant to CMAS infiltration, in particular for application to a substrate 14 of hot section components of gas turbine engines. The substrate 14 typically is a metallic substrate in need of thermal protection. Exemplary substrates include nickel base superalloy substrates.

In an exemplary embodiment, the coating system 12 includes a bond coat layer 16 overlying and in contact with at least a portion of the substrate 14. The bond coat layer 16 may be an overlay coating, such as MCrAlX (where M=Ni, Co, Fe, and their combinations, and X=Y, Hf, Zr, Re, Si etc. and their combinations), although it may also be a diffusion aluminide, referred to herein as a coating or glaze, such as a simple aluminide (NiAl) or a platinum modified aluminide ((Ni,Pt)Al). The bond coat layer 16 may promote the formation of a thin, tightly adherent aluminum oxide layer 20, commonly known as a thermally grown oxide (TGO). In an exemplary embodiment, a thermal barrier coating (TBC) 24 overlies the bond coat layer 16. The TGO acts as an adhesion layer between the TBC 24 and the bond coat layer 16. The bond coat layer also provides oxidation protection to the underlying substrate. In an exemplary embodiment, the TBC includes at least a TBC inner layer 26 and a rare earth aluminate-containing TBC top layer 28 overlying at least a portion the TBC inner layer 26. In an exemplary embodiment, the inner layer 26 overlies and is in contact with the TGO layer 20, or the bond coat layer 16 in the absence of the TGO layer 20. Optionally, the TBC may include a transitional layer 30 generally disposed between the inner layer 26 and the top layer 28. Reference to "transitional layer 30" is intended to encompass one or more transitional sub-layers forming a compositional gradient between inner layer 26 and top layer 28. In the absence of the optional transitional layer 30, the top layer 28 generally overlies and is in contact with the inner layer 26.

In an exemplary embodiment, the TBC inner layer 26 may be a thermal barrier coating material, such as yttria-stabilized zirconia (YSZ). An exemplary yttria-stabilized zirconia includes zirconia stabilized with 7 wt % yttria, as is referred to a 7YSZ. In an exemplary embodiment, the TBC inner layer 26 may comprises zirconia stabilized with about 4-9 weight % yttria. Alternately, the TBC inner layer 26 may comprise hafnia, or combination of hafnia and zirconia stabilized with about 4-9 weight % yttria. It is envisioned that other compatible thermal barrier coating compositions and coating systems may be utilized in the exemplary embodiments disclosed herein. For example, the TBC may be a low thermal conductivity thermal barrier coating as described for example in U.S. Pat. No. 6,558,814. It is further envisioned that the TBC inner layer 26 may comprise a plurality of sub-layers able to provide the desired thermal barrier protection to the underlying substrate.

Figure 2:
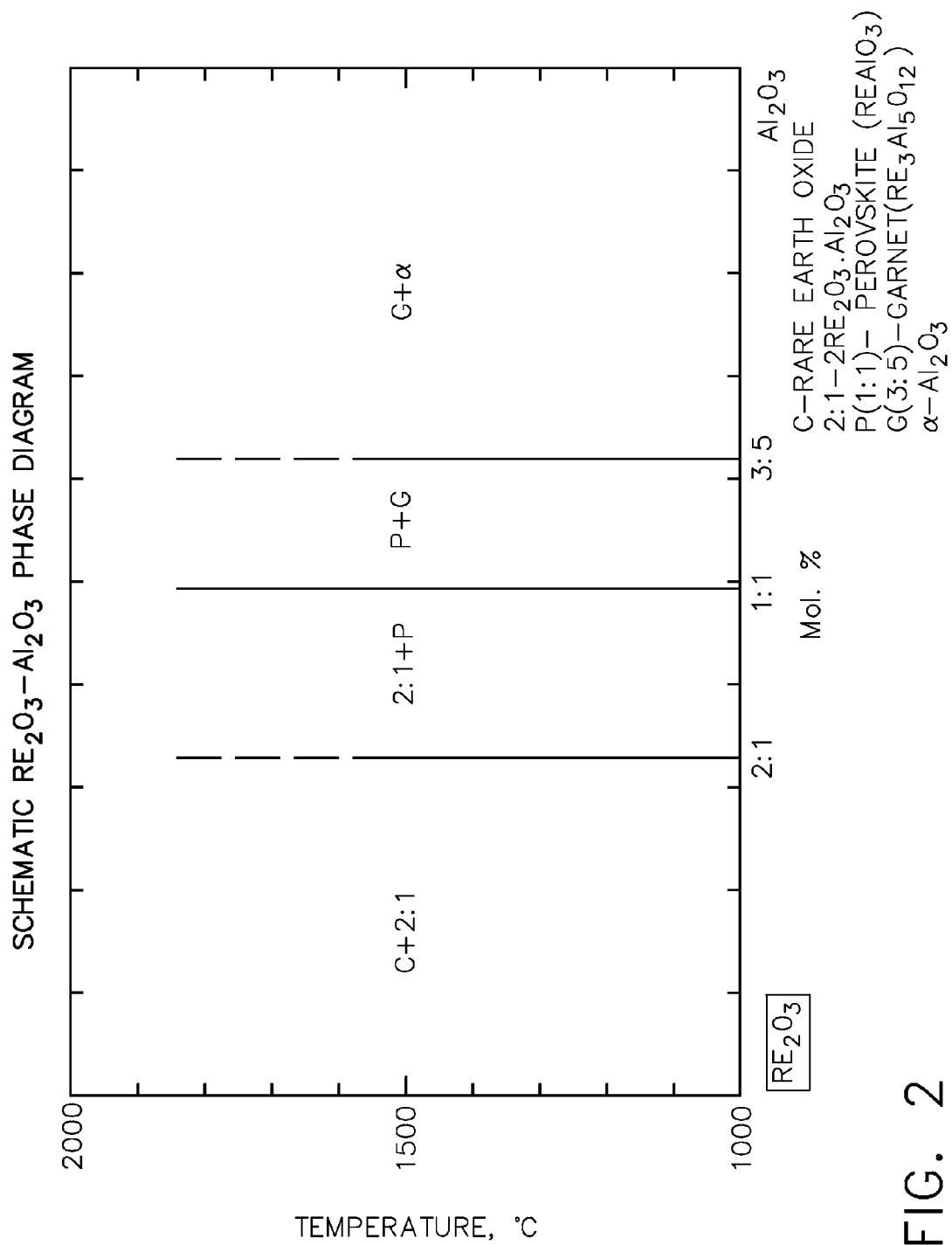
FIG. 2 is a schematic representation of a $Re_2O_3$—$Al_2O_3$ phase diagram illustrating exemplary rare earth aluminate compounds.

In an exemplary embodiment, TBC top layer 28 comprises a rare earth aluminate-containing material. Exemplary single-phase rare earth aluminate compounds include 2 $RE_2O_3.Al_2O_3$; $REAlO_3$; $RE_3Al_5O_{12}$, where RE=an element of the lanthanum series, yttrium, or combinations thereof. For purposes of the disclosure, the rare earth aluminate-containing material may be regarded as having an aluminum oxide ($Al_2O_3$) component, and a rare earth oxide component. FIG. 2 provides a schematic $Re_2O_3$—$Al_2O_3$ phase diagram illustrating representative rare earth aluminate-containing materials.

Figure 3:
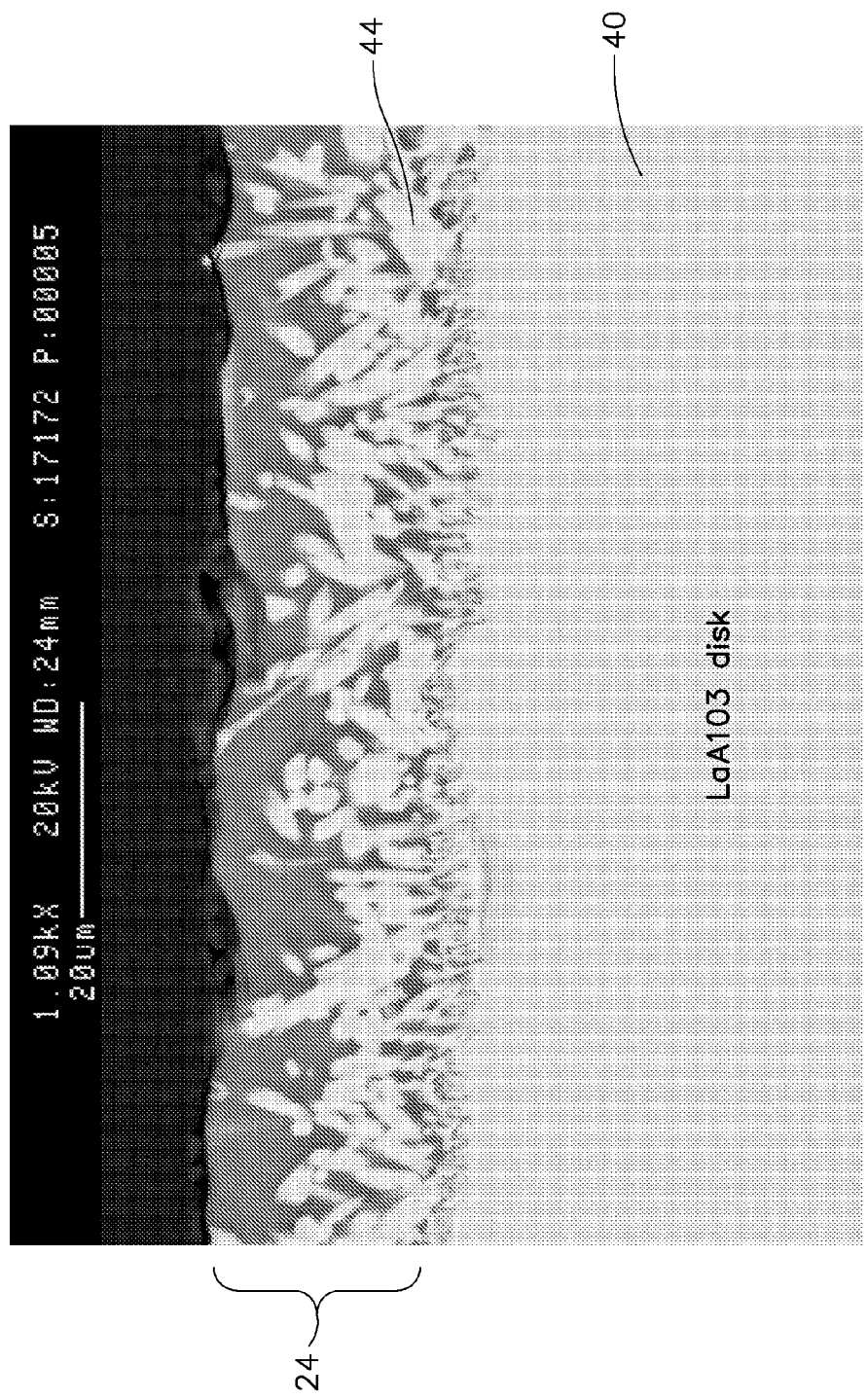
FIG. 3 is a micrograph showing post-reaction microstructure of a rare earth aluminate sample after exposure to CMAS at 2500° F. (1371° C.) for one hour.

With reference to FIG. 3, upon elevated temperature exposure to CMAS, the aluminum oxide component of the rare earth aluminate containing material 40 interacts with the CMAS to raise the CMAS melting point. The rare earth oxide component reacts with the CMAS to form a sealing reaction layer 42 including a high melting point rare earth calcium silicate phase 44. This sealing reaction layer 42 is effective to protect the underlying TBC layer from CMAS attack at elevated temperatures once the CMAS becomes liquid.

The rare earth aluminate-containing TBC top layer 28 may include a single phase rare earth aluminate compound, a mixture of two or more rare earth aluminate compounds, a rare earth aluminate compound and $Al_2O_3$, a rare earth aluminate compound and rare earth oxide, where the rare earth is an element of the lanthanum series, yttrium, or combinations thereof.

In an exemplary embodiment, the rare earth aluminate-containing TBC top layer material can have a $Al_2O_3$ component concentration ranging from about 20 to about 90 mole %, with the remainder including a rare earth oxide, where the rare earth is a lanthanum series element, yttrium, or combinations thereof. Exemplary rare earth aluminate compounds include $2Gd2O3.Al_2O_3$, $2Dy_2O_3.Al_2O_3$, $2Y_2O_3.Al_2O_3$, $2Er_2O_3.Al_2O_3$, $LaAlO_3$, $NdAlO_3$, $SmAlO_3$, $EuAlO_3$, $GdAlO_3$, $DyAlO_3$, $ErAlO_3$, $Dy_3Al_5O_{12}$, $Y_3Al_5O_{12}$, $Er_3Al_5O_{12}$, and $Lu_3Al_5O_{12}$.

The optional transitional layer 30 may include a stabilized zirconia component (e.g., 7YSZ) and a rare earth aluminate-containing component (e.g., a material similar to TBC top layer 28). If present, the transitional layer 30 is intended to provide a compositional gradient between inner layer 26 and top layer 28. Multiple transitional sub-layers may be provided, with the relative concentrations of the stabilized zirconia component and rare earth aluminate-containing component decreasing and increasing, respectively, in the direction toward the top layer 28. For example the transitional layer 30 may provide a concentration of rare earth aluminate-containing component of about 10 weight % toward a middle region of the coating. Toward the outer surface of the transitional layer, the concentration of the rare earth aluminate-containing component may approach 100 weight %.

With reference again to FIG. 1, an exemplary thermal barrier coating system includes a bond coat layer 16 of about 1 to about 6 mils thick (about 25.4 to about 152 microns); a TBC inner layer 26 of about 1 to about 10 mils thick (about 25.4 to about 254 microns); and a TBC top layer 28 of about 0.5 to about 10 mils thick (about 12.7 to about 254 microns). This exemplary thermal barrier coating system may be useful for providing the desired CMAS resistance for gas turbine engine blades and nozzles, and combustor parts.

Another exemplary thermal barrier coating system includes a bond coat layer 16 of about 2 to about 20 mils thick (about 50.8 to about 508 microns), a TBC inner layer 26 of about 2 to about 25 mils thick (about 50.8 to about 635 microns), and a TBC top layer 28 of from about 10 to about 60 mils thick (about 254 to about 1524 microns). This exemplary thermal barrier coating system may be useful for providing the desired CMAS resistance for gas turbine engine shrouds, and combustor parts. In an exemplary embodiment, the portion of the inner layer 26 particularly susceptible to CMAS degradation is overlaid with the TBC top layer 28.

Figure 4:
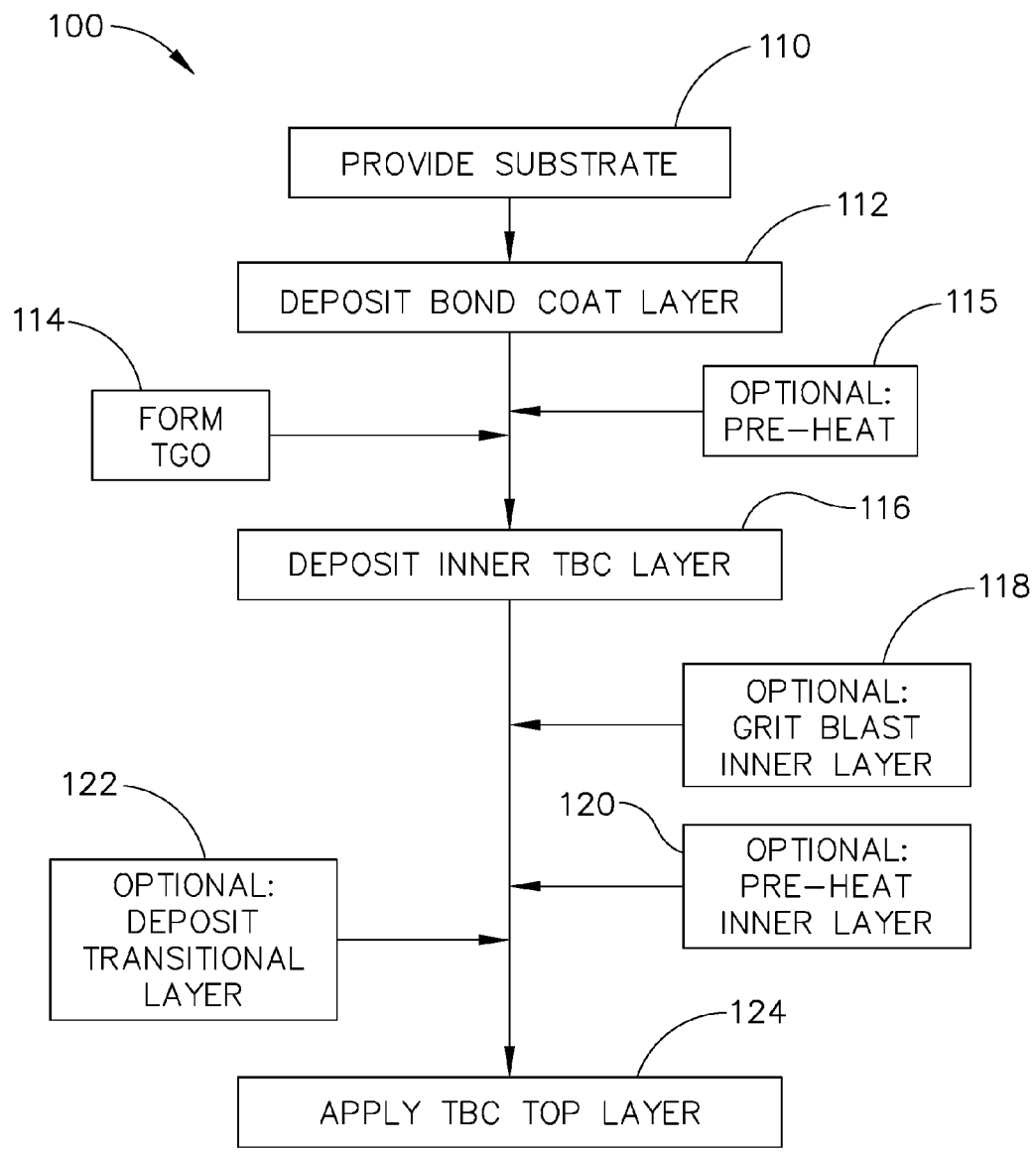
FIG. 4 is a flowchart of an exemplary coating process.

In an exemplary embodiment, a method for increasing resistance to CMAS degradation of a thermal barrier coating system is illustrated in FIG. 4. In an exemplary method 100, a substrate such as a component for a high temperature region of a gas turbine engine is provided (Step 110). A bond coat layer is deposited on at least one surface of the substrate (Step 112). The bond-coated substrate may be subjected to suitable conditions to form a thermally grown oxide layer (Step 114). In an exemplary embodiment, the bond coat layer is substantially overlaid with an inner thermal barrier coating layer (Step 116). The inner thermal barrier coating layer may be deposited by a suitable method such as physical vapor deposition (e.g., electron-beam physical vapor deposition (EB-PVD)) or by thermal spray (e.g., air plasma spray (APS)). The inner thermal barrier coating layer may be deposited in such a manner as to exhibit a microstructure referred to herein as dense vertical microcracks (DVM) as is known in the art. The inner thermal barrier coating layer may exhibit other microstructures depending on the deposition process such as a columnar structure (e.g., from EB-PVD deposition) or a splat-like structure (e.g., from APS). Optionally, the bond-coated substrate may be pre-heated prior to application of the inner thermal barrier coating layer. (Step 115).

In an exemplary method the TBC inner layer may optionally be modified for reception of subsequent TBC layer(s) (Step 118). For example, the surface may be roughened by grit blasting or other surface-modifying techniques. In an exemplary embodiment, the TBC inner layer may optionally be pre-heated prior to deposition of subsequent TBC layer(s) (Step 120).

In an exemplary embodiment, one or more transitional layers may optionally be deposited onto the inner layer (Step 122).

In an exemplary embodiment, a rare earth aluminate-containing material is deposited onto the TBC inner layer (or the optional transitional layer(s)) by a suitable deposition process to form a TBC top layer (Step 124). In an exemplary embodiment, the deposition process may include a physical vapor deposition process. In an exemplary embodiment, the deposition process may include a thermal spray process. Other deposition processes may include liquid spray or liquid reagent infiltration processes. Those with skill in the art will appreciate that various deposition processes may be employed depending on the desired thickness, microstructure, and other thermal or mechanical properties. It is envisioned that the various layers of the TBC system may be deposited by different processes to achieve a desired outcome.

Upon exposure of the coated component to CMAS at elevated temperatures, the melting point of the CMAS is elevated upon contact with the TBC top layer due to dissolution of $Al_2O_3$ component from the TBC top layer. The elevated melting point deters formation of the highly destructive liquefied CMAS. The rare earth aluminide component from the TBC top layer interacts with the CMAS to form a rare earth calcium silicate phase. The interaction of the CMAS with the TBC top layer effectively forms a sealing reaction layer.

The coating layers disclosed herein may be applied by any suitable method. The method of application may be determined by the component to be coated. Shroud and combustor assemblies require thicker coatings, but are relatively simple shapes. Methods such as thermal spray processes may be used to apply the various layers. Thermal spray processes are inexpensive and relatively quick methods for applying a thick coating to a surface. These techniques generally are line of sight processes. Thermal spray processes include air plasma spray, vacuum plasma spray, low pressure plasma spray, HVOF, detonation gun, and other related methods.

Thinner coatings are required on structures such as blades and vanes. The thinner coatings require more precise controls. Physical vapor depositions are preferred for these applications. Electron beam methods (EB-PVD) are the most preferred method for applying thin coatings to articles such as blades and vanes.

EXAMPLE

Figure 5:
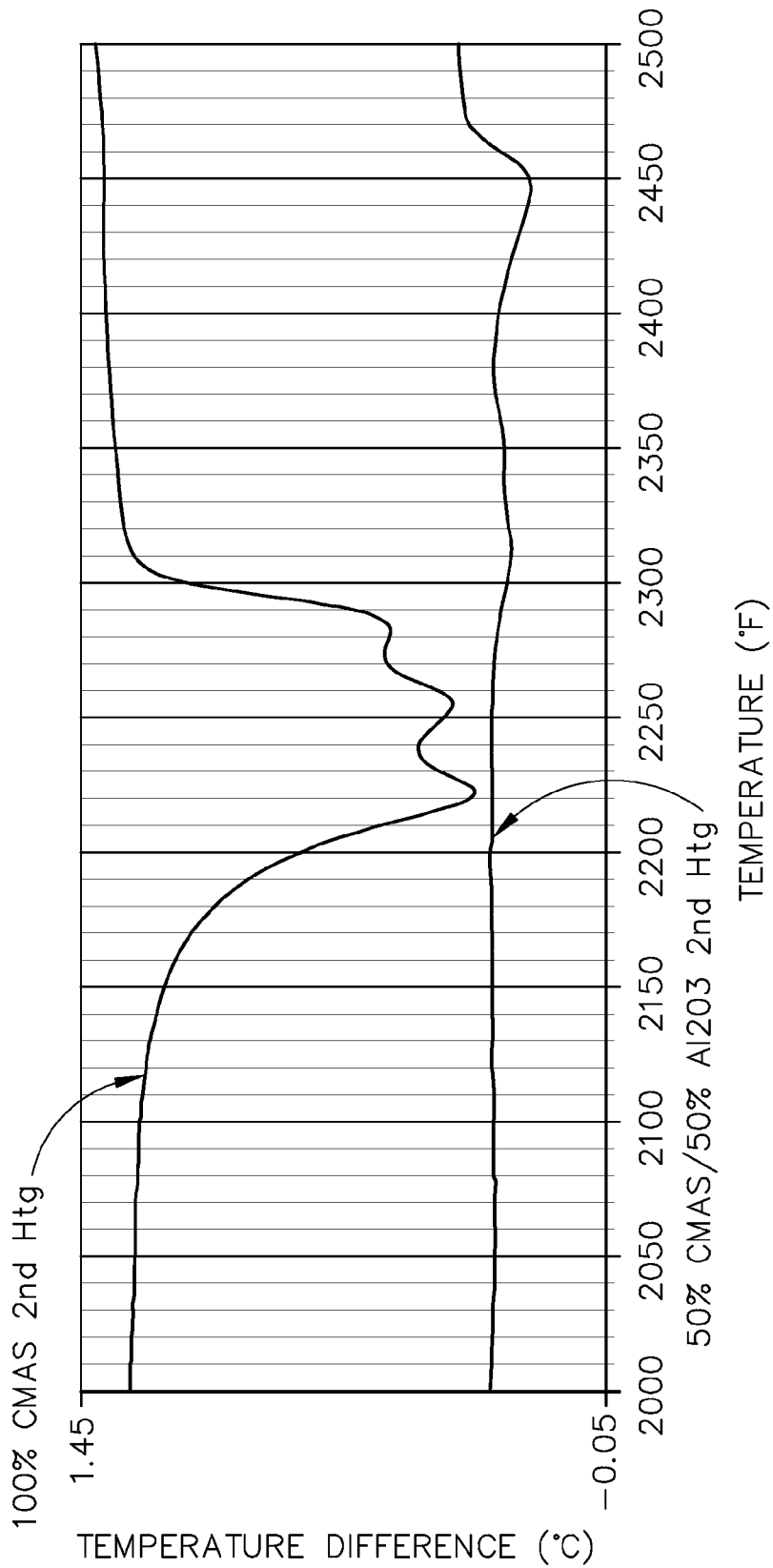
FIG. 5 depicts differential thermal analysis (DTA) curves from a test sample.

A single phase rare earth aluminate sample ($LaAlO_3$) was exposed to CMAS at 2500° F. ((1371° C.)) for 1 hour. The micrograph shown in FIG. 2 illustrates the reaction products. $LaAlO_3$ reacts with CMAS to form a La calcium silicate phase (needle-like shapes). Energy dispersive spectrometer (EDS) analysis showed that the $Al_2O_3$ content in the post reaction CMAS is much higher than in the original CMAS, an indication of $Al_2O_3$ component from $LaAlO_3$ dissolution in the original CMAS. The dissolution of $Al_2O_3$ in CMAS leads to a CMAS melting point increase, as demonstrated by the $CMAS/Al_2O_3$ differential thermal analysis (DTA) curves in FIG. 5.

Thus, this example demonstrates that a rare earth aluminate containing TBC top layer provides CMAS protection in the high temperature range by the formation of the sealing reaction layer containing rare earth calcium silicate, and in the low temperature range (where rare earth calcium silicate formation is sluggish) by the CMAS melting point increase due to $Al_2O_3$ content of the top layer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article having a CMAS infiltration-resistant thermal barrier coating system comprising:
   a substrate having a surface;
   a bond coat overlying and in contact with the substrate surface;
   a thermally grown oxide layer on the bond coat; and
   a thermal barrier coating overlying the thermally grown oxide layer, the thermal barrier coating comprising:
      an inner layer comprising a thermal barrier coating material including at least one of zirconia and hafnia; and
      a top layer overlying at least a portion of the inner layer, wherein the top layer includes a rare earth aluminate-containing material;
   wherein the substrate comprises a superalloy material selected from a nickel base superalloy, an iron base superalloy, a cobalt base superalloy, and combinations thereof.

2. The article according to claim 1 wherein the rare earth aluminate-containing material comprises a single phase rare earth aluminate compound.

3. The article according to claim 1 wherein the rare earth aluminate-containing material comprises at least one compound selected from the group consisting of $2Gd2O3.Al_2O_3$, $2Dy_2O_3.Al_2O_3$, $2Y_2O_3.Al_2O_3$, $2Er_2O_3.Al_2O_3$, $LaAlO_3$, $NdAlO_3$, $SmAlO_3$, $EuAlO_3$, $GdAlO_3$, $DyAlO_3$, $ErAlO_3$., $Dy_3Al_5O_{12}$, $Y_3Al_5O_{12}$, $Er_3Al_5O_{12}$, and $Lu_3Al_5O_{12}$.

4. The article according to claim 1 wherein the rare earth aluminate-containing material includes from about 20 to about 90 mole % of an aluminum oxide (($Al_2O_3$) component with a remainder including a rare earth oxide.

5. The article according to claim 1 including a component for a gas turbine engine wherein the component is a gas turbine engine blade, nozzle, or combustor part.

6. The article according to claim 5 wherein the bond coat has a thickness of between about 2 to about 20 mils, wherein the inner layer has a thickness of from about 2 to about 25 mils, and wherein the top layer has a thickness of from about 10 to about 60 mils.

7. The article according to claim 1 including a component for a gas turbine engine wherein the component is a turbine engine blade or nozzle.

8. The article according to claim 7 wherein the bond coat has a thickness of between about 1 to about 6 mils, wherein the inner layer has a thickness of from about 1 to about 10 mils, and wherein the top layer has a thickness of from about 0.5 to about 10 mils.

9. The article according to claim 1 wherein the rare earth aluminate-containing material comprises a mixture of two or more rare earth aluminate compounds.

10. The article according to claim 1 wherein the rare earth aluminate-containing material comprises a rare earth aluminate compound and aluminum oxide ($Al_2O_3$).

11. The article according to claim 1 wherein the rare earth aluminate-containing material comprises a rare earth aluminate compound and rare earth oxide.

* * * * *